(12) United States Patent
Noble et al.

(10) Patent No.: US 9,567,474 B2
(45) Date of Patent: Feb. 14, 2017

(54) SPRAYABLE COMPOSITION FOR STABILISING BROKEN GLASS AND METHOD OF APPLYING SAME

(71) Applicant: AIE FINSOL PTY LIMITED, West Wollongong (AU)

(72) Inventors: William J. Noble, West Wollongong (AU); John P. Scott, West Wollongong (AU); Loyd Roomie, West Wollongong (AU)

(73) Assignee: AIE FINSOL PTY LIMITED, West Wollongong (AU)

( * ) Notice: Subject to any disclaimer, the term of this patent is extended or adjusted under 35 U.S.C. 154(b) by 0 days.

(21) Appl. No.: 15/174,966

(22) Filed: Jun. 6, 2016

(65) Prior Publication Data

US 2016/0376461 A1 Dec. 29, 2016

Related U.S. Application Data

(63) Continuation-in-part of application No. 14/575,459, filed on Dec. 18, 2014, now abandoned.

(30) Foreign Application Priority Data

Dec. 18, 2013 (AU) ................ 2013904939

(51) Int. Cl.
| | |
|---|---|
| C09D 133/00 | (2006.01) |
| C08K 5/521 | (2006.01) |
| C09D 133/04 | (2006.01) |
| C03C 17/32 | (2006.01) |

(52) U.S. Cl.
CPC ............ *C09D 133/04* (2013.01); *C03C 17/32* (2013.01); *C03C 2218/112* (2013.01)

(58) Field of Classification Search
CPC ........ C03C 17/002; C03C 17/28; C03C 17/30; C03C 17/32; C03C 2217/29; C03C 2217/78; C08L 33/00; C08K 5/521; C08K 5/5415
See application file for complete search history.

(56) References Cited

U.S. PATENT DOCUMENTS

| | | | |
|---|---|---|---|
| 6,420,474 | B1 | 7/2002 | Carey et al. |
| 7,231,747 | B2 | 6/2007 | Diamond |
| 2008/0194745 | A1 | 8/2008 | Cobb |

OTHER PUBLICATIONS

Rohm and Haas—RHOPLEX™ AC-3001 Emulsion "Aqueous Acrylic Vehicle for Coatings Over Cememtitious Substrates", manufactured by the dow Chemical company, 12 pages; 2008.
ASHLAND—Dextrol™ and Strodex™—Surfactant Selection Guide; 8 pages; 2010, 2011.
DOW—ACRYSOL™ TT-615 Rheology Modifier; 7 pages; 2013.
ASHLAND—Dextrol® and Strodex® Specialty Surfactants, Drewplus® Form Control Agents "For pressure sensitive adhesives and graphic arts applications"; 2 pages.
DOW—ELASTENE™ 2468M Acrylic Emulsion, "100% Acrylic Polymer for High Performance Elastomeric Wall Coatings"; 2 pages; 2014.
Drewplus T-4507—Foam Control Agent; ASHLAND, Product Data; pp. 1-2; Jul. 2013.
Strodex™ TH-100 phosphate ester surfactant; ASHLAND, Product Data; pp. 1-3; Oct. 2012.
RHOPLEX™ EC-2848 100% Acrylic Polymer Emulsion for Elastomeric Coatings; pp. 1-6.
RHOPLEX™ EC-2848 100% Acrylic Polymer Emulsion for Elastomeri Coatings; DOW; pp. 1-7; Jul. 1998.
How can we advance your paint? Architectural binders summary table; DOW; pp. 1-2; Jul. 2012.
Safety Data Sheet—Product name: RHOPLEX™ 2438C Emulsion; DOW; pp. 1-12; Oct. 9, 2015.
Technical Data Sheet—RHOPLEX™ 2438C Emulsion for High-Performance Elastomeric Wall Coatings; DOW; pp. 1-3.
You Asked . . . We Delivered! Leading the Way in High Performance Coatings for Specialty Mat Applications; DOW; pp. 1-2.
Construction Chemicals; DOW; pp. 1-6.
Canada Colors and Chemicals Limited; DOW; Material Safety Data Sheet; pp. 1-7; Oct. 11, 2012.
Material Safety Data Sheet; Product Name: PRIMAL™ AC-3001R Emulsion; DOW; pp. 1-9; Oct. 28, 2013.
Material Safety Data Sheet; Product Name: PRIMAL™ AC-3001R Emulsion; DOW; pp. 1-9; Oct. 29, 2013.
Safety Data Sheet; Product Name: ACRYSOL™ TT-615 Thickener; DOW; pp. 1-6; Feb. 3, 2012.
Material Safety Data Sheet; Product Name: ACRYSOL™ TT-615 Thickener; DOW; pp. 1-7; Nov. 11, 2013.
Technical Data Sheet; ACRYSOL™ TT-615 Rheology Modifier; DOW; pp. 1-7; Mar. 2013.
Elastomeric Wall Coating; Formulation S-2438-1; Based on ELASTENE™ 2438, Acrylic Emulsion; Rohm & Haas; pp. 1-2; Sep. 2000.
Heat Insulation Coating; Formulation S-2438-2; Based on ELASTENE™ 2438, Acrylic Emulsion; Rohm & Haas; pp. 1-2; Sep. 2000.
Performance Properties; PRIMAL™ 2438, 100% Acrylic Emulsion, Polymer for Elastomeric Coatings; Rohm & Haas; pp. 1-8; Sep. 2000.

(Continued)

*Primary Examiner* — Wenwen Cai
(74) *Attorney, Agent, or Firm* — Venable LLP; Steven J. Schwarz; David M. Klecyngier

(57) ABSTRACT

A sprayable glass stabilizing composition including: a self-crosslinking acrylic co-polymer emulsion in the amount of 52.6% to 67.1% w/w, a crosslinkable thermoplastic all-acrylic polymer emulsion binder in the amount of 23.0% to 31.8% w/w, the binder having a higher glass transition temperature than the self-crosslinking acrylic co-polymer emulsion; an anionic hydrophobically-modified alkali swellable acrylic polymer emulsion rheology modifier in the amount of 0.45% to 0.61% w/w; an ester surfactant in the amount of 0.45% to 0.61% w/w; a foam control agent in the amount of 0.45% to 0.61% w/w; and the remaining content as water up to 100% w/w.

26 Claims, 5 Drawing Sheets

(56) References Cited

OTHER PUBLICATIONS

Formulating With ELASTENE 2438 Acrylic Emulsion; ELASTENE™ 2438, 100% Acrylic Emulsion Polymer for Elastomeric Coatings; Rohm & Haas; pp. 1-5; Sep. 2000.
ELASTENE™ 2438, 100% Acrylic binder for elastomeric high-build coatings; Asia-Pacific Region; Rohm & Haas; pp. 1-2; Apr. 2008.
RHOPLEX™ AC-3001 Emulsion, Aqueous Acrylic Vehicle for Coatings Over Cementitious Substrates; Rohm & Haas; pp. 1-12; 2008.
Aldrich-Homopolymer-Properties "Thermal Transitions of Homopolymers: Glass Transition & Melting Point", pp. 52-53.

SPRAYABLE COMPOSITION FOR STABILISING BROKEN GLASS AND METHOD OF APPLYING SAME

RELATED APPLICATIONS

This patent application is a continuation-in-part of U.S. application Ser. No. 14/575,459, filed on Dec. 18, 2014, which claims priority to Australian Application 2013 904 939, filed Dec. 18, 2013, the entire disclosure of each is hereby incorporated by reference.

FIELD OF THE INVENTION

The present invention relates to a sprayable composition that forms a protective film to glass that has been broken or fractured or is at risk of such.

The invention has been developed primarily for use in safely removing broken glass panes or remnants thereof and will be described hereinafter with reference to this application. However, it will be appreciated that the invention is not limited to this particular field of use and is applicable to glass in expectation or anticipation of damage or fracture and need for subsequent removal and/or replacement.

BACKGROUND OF THE INVENTION

Glass window and door panes, and including window and door structures substantially or wholly formed from glass, are ubiquitous and come in a range of different sizes, thicknesses, compositions and types. Most commonly, glass panes have been 'float glass' which is made by floating glass ingredients on a molten bed.

Float glass is typically 2-12 mm thick and was, until relatively recently, the choice for most windows and doors, particularly in homes. Many premises still have float glass panes and often a significant number. Unfortunately, this glass is dangerous when it is fractured or broken as it breaks into sharp shards or splinters. This is a dangerous situation and includes, for example, where a person breaks a float glass pane, damage is often done by the sharp broken edges that are created. Broken float glass panes require thorough removal to ensure all broken glass is removed, especially where children are likely to dwell such as in homes or public areas.

Toughened glass has in the past been a single pane whereas laminated glass is typically two or more panes attached together. Typically, toughened glass is between 3-12 mm and above thick. Laminated glass panes are somewhat larger, typically being between about 5.38-16 mm and above thick. Toughened glass panes are designed, when broken or fractured, to crumble into small pieces that have sharp edges. These small pieces typically pose a hazard to handling and of course have the obvious danger that small pieces may not be entirely removed. It should be noted that float glass will generally crack, break to large pieces as well as shards whereas toughened will crack and break to small pieces.

Toughened glass is intended to shatter and has a tendency to collapse when fractured or broken. Laminated panes often are not intended to shatter and only to retain fragments to the extent some strength remains from the remnants of the fractured glass pane. When laminated glass panes are broken or fractured, irregular sharp shards and fragments are created. Laminated glass is made up of two (or more) sheets of float glass joined together and if only one surface of the laminated glass has broken or fractured the laminated glass will remain as one, but if both surfaces have been broken or fractured, the glass pane will become unstable. It will be understood that in either the case of toughened or laminated glass panes, remaining parts of a fractured or broken glass pane are fragile to being handled.

It is also considered that broken toughened glass, for example, can release glass dust or fine particles of glass sufficient to possibly lead to respiratory difficulties. This is particularly relevant for glaziers, for example, who are regularly required to replace such broken glasses including balustrades and potentially have continual or prolonged exposure to such dust or particles.

Regardless of the type of glass pane or whether it is a glass object or contains glass such as a door, it is typical to simply remove a fractured or broken pane by literally knocking it out of its frame or support. This is obviously messy and relatively dangerous and far from ideal in many circumstances. For example, window or glass balustrades in multi-level buildings cannot simply be knocked out or allow any glass to fall outwardly away from the building in the process. However, toughened or laminated (both glass panes) glass panes that are broken or fractured, or parts of them, may fall on their own accord, even in a relatively gentle breeze or such as by the closing/opening of an internal door changing air pressure about the fractured window.

Any handling of the fractured or broken glass is most undesirable for the obvious reasons. Once the glass is removed, it is usually the case that fragments of the broken glass are found in the framing of windows or tracks of sliding doors or about the general location of the glass when fractured.

It is known to apply a tape or adhesive sheet to one or both sides of the remnants of a fractured or broken window pane, for example. However, this inherently can disturb the pane causing the fractured pane or any fragile remnants to fall. Notwithstanding, it is difficult to apply a tape or adhesive sheet in many circumstances due to the fragility of what remains, noting the difficulties in reaching the outside of the window or balustrade on multilevel buildings.

Of recent times, a method of removing broken or fractured window pane was developed. This is described in U.S. Pat. No. 7,231,747 (the 747' patent). In this patent, a two part foam is mixed at application by a spraying device and applied to remnants of a broken window. Once sprayed, the separated contents immediately mix and react creating the foam which expands and solidifies forming a unitary mass. The entire foam unitary mass enveloping the remnants of the broken glass pane are then removed.

This has shown to be a somewhat useful invention for its intended use of replacing the need to board external windows and glass doors and to a lesser degree those with fractured float glass. However, it is severely lacking for use with other glasses, particularly those that are especially fragile once fractured or broken or where the remnants are above ground level.

The method of the 747' patent requires that the entire window frame and surrounding areas be securely taped off before the foam is applied to the broken pane. As the foam is applied and expands, significant weight is added to the broken glass pane. The mere application of the foam to broken toughened glass can in itself cause the remnants to collapse. Further, applying a masking layer will often do likewise and create risks from falling glass fragments. Furthermore, the 747' patent also requires that once the foam has solidified, boards and later handles are required to remove the foam containing the broken glass. Obviously, this is most undesirable in multi-level buildings. This is emphasised by the 747' patent in that plywood or other pre-formed panels can be used to impart stability on a destabilised glass window pane. This can assist in holding the remnants in place until the foam solidifies, however, applying the plywood is not possible from the outside of a multi-level building on many occasions and its mere placement would cause destabilisation. Most undesirably, the expanded foam mass can easily damage most types of window frame such as powder coated aluminium or painted timber, and possibly surrounding material if not exactly taped off or if accidentally sprayed onto.

In addition to the 747' patent, other sprayable foaming protective compositions are known and are commercially available. Foaming glass protective methods however exhibit some tendency to cling to a surface when sprayed thereon and to dwell on the surface for a long period of time. Foams often contain at least 15 to 30 percent air, which is known to result in incomplete product to surface contact during dwell time, thus also reducing convenience.

Genesis of the Invention

The genesis of the present invention is a desire to provide a composition which can be sprayed on to broken window panes forming a film to stabilise them for their removal and which overcomes the disadvantages of the prior art, or to provide a useful alternative.

SUMMARY OF THE INVENTION

According to a first aspect of the invention there is provided a sprayable glass stabilising composition comprising:
- a self-crosslinking acrylic co-polymer emulsion on the amount of 52.6% to 67.1% w/w;
- a crosslinkable thermoplastic all-acrylic polymer emulsion binder in the amount of 23.0% to 31.8% w/w, the binder having a higher glass transition temperature than the self-crosslinking acrylic co-polymer emulsion;
- an anionic hydrophobically-modified alkali swellable acrylic polymer emulsion rheology modifier in the amount of 0.45% to 0.61% w/w;
- an ester surfactant in the amount of 0.45% to 0.61% w/w;
- a foam control agent in the amount of 0.45% to 0.61% w/w;
- remaining content as water to 100% w/w.

According to a second aspect of the invention there is provided a sprayable glass stabilising composition comprising:
- a self-crosslinking acrylic co-polymer in the amount of 0.25 to 0.67 relative proportion (w/w);
- a crosslinkable thermoplastic all-acrylic polymer binder in the amount of 0.11-0.30 relative proportion (w/w), the binder having a higher glass transition temperature than the self-crosslinking acrylic co-polymer;
- an anionic hydrophobically-modified alkali swellable acrylic polymer rheology modifier in the amount of 0.0011 to 0.0040 relative proportion (w/w);
- an ester surfactant in the amount of 0.0035 to 0.0097 relative proportion (w/w);
- and a foam control agent in the amount of 0.005 to 0.012 relative proportion (w/w);

It can therefore be seen there is advantageously provided a sprayable glass stabilising composition having a relatively negligible mass that can be applied to one face of a broken or fractured glass pane to stabilise it and allow it to be removed. Most advantageously, no masking about or other interference of the broken or fractured pane is required in order to apply the composition and stabilise the glass pane, and it can be sprayed on by any lay person or professional alike. Furthermore, the composition is suited for use is stabilising broken glass panes on multilevel buildings eliminating any need for external access to the broken glass pane.

DESCRIPTION OF THE DRAWINGS

Preferred embodiments of the composition of the invention will now be described, by way of example only, with reference to the accompanying drawings and following non-limiting examples in which.

DETAILED DESCRIPTION

Figure 1:
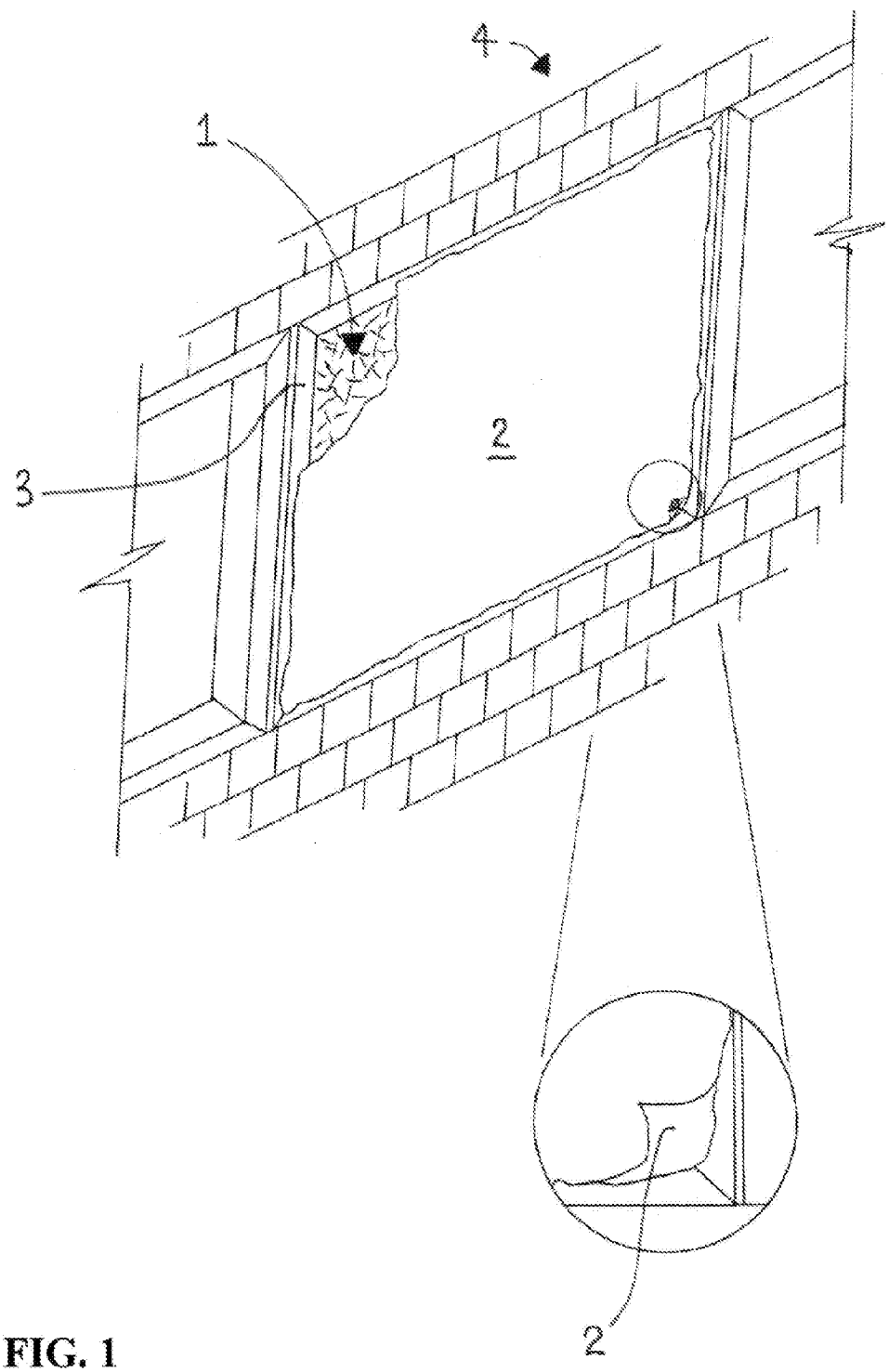
FIG. 1 is a schematic elevated perspective view of a window pane having been sprayed with a sprayable glass composition according to an example of a first preferred embodiment.

The term "glass" as used herein is intended to include various types of glass including treated glass, untreated glass, tempered glass, laminated glass, single pane glass, double pane glass, etc. and is not limited to any particular types of glass.

The sprayable glass composition of preferred embodiments are preferably sprayed on to glass to stabilize a window, door, curtain, or partition structures formed from or including glass or glass panes (for example including a glass door or framed glass door) installed or to be installed in fabrications or constructions, such as office buildings and residential homes and apartments. It may be applied to window, door, curtain, partition structures of any type including one or more glass panes disposed in an opening circumscribed by a window, door, curtain, and partition frame. The opening and frame may form or be disposed in exterior or interior walls or doors of the fabrication or construction or may be free-standing, such as where the fabrications or constructions are showers, telephone booths, glass cubicles, balustrades, curtain windows, glass bricks and the like.

It will be appreciated the window, door, curtain, partition structure may include one or more tracks receiving a peripheral edge of the one or more window, door, curtain, partition glass panes. The glass panes may be flat or planar or may have curved or other non-planar shapes or profiles. The window, door, curtain, partition frame may be constructed separately from the fabrication or construction as a frame member including one or more parts, or may be formed integrally, unitarily with the fabrication or construction. The window, door, curtain, partition structure may include one or more transoms &/or mullions dividing the opening into separate sections, each receiving a window, door, curtain, partition glass pane.

In the latter case, the mullions may include tracks receiving peripheral edges of the window, door, curtain, partition glass panes. The tracks can be made as separate pieces, or can be formed integrally with the window, door, curtain, partition frame, the fabrication or construction and/or the mullions. Representative window, door, curtain, partition structures include sash windows, casement windows, sliding windows, sliding glass doors, non-movable windows, fixed windows, movable windows, protruding windows, recessed windows and the like in fabrications or constructions of any type. Fabrications and constructions using glass panes to which the composition of the preferred embodiments may be applied include commercial, residential, governmental and recreational fabrications or constructions. The composition may also be sprayed onto broken or fractured automobile windows.

The composition according to a first preferred embodiment is a liquid at room temperature and is sprayable onto a glass pane or remnants thereof. The composition preferably continuously solidifies upon application to glass. The preferred embodiments are generally intended to be applied to stabilize window, door, curtain, partition structures having shattered, broken, cracked or missing glass panes and to safely remove the shattered, broken, cracked glass from window, door, curtain, partition structures. Further, the preferred embodiments are intended to stabilize a window, door, curtain, partition structure in which all or substantially all of the glass is missing therefrom, to safely removing glass shards from a track of a window, door, curtain, partition structure, and to safely removing a shattered, broken, cracked window, door, curtain, partition glass pane. Additionally, the composition of the preferred embodiments can be applied to a window, door, curtain, partition which assists in protecting in against those shattered, broken or cracked windows, door, curtain, partition due to storm or other conditions.

The sprayable glass stabilising composition of the first preferred embodiment includes a self-crosslinking internally-plasticised acrylic co-polymer emulsion on the amount of about 52.6% to 67.1% w/w, being the weight of ingredient as a percentage of the total weight of the composition (hereafter referred to as the "acrylic copolymer emulsion", which includes an "acrylic copolymer"). More preferably, the composition includes the acrylic co-polymer emulsion in the amount of 52.6% to 55% w/w. The acrylic co-polymer emulsion preferably includes an acrylic co-polymer content of between 48% to 53% w/w; and has a total water content of between 47% to 52% w/w and a total solids content of between 48% to 53% w/w. The composition further includes a crosslinkable thermoplastic all-acrylic polymer emulsion binder in the amount of 23.0% to 31.8% w/w (hereafter referred to as the "all-acrylic polymer emulsion", which includes an "all-acrylic polymer"). Most preferably, the all-acrylic polymer emulsion is included in the amount of 23% to 26% w/w. The all-acrylic polymer emulsion preferably includes an acrylic polymer content of between 45% to 51% w/w; and has a total water content of between 49% to 55% w/w and a total solids content of between 45% to 51% w/w.

In the preferred embodiments, the acrylic co-polymer has a glass transition temperature of between −25° C. to −19° C. and the all-acrylic polymer has a glass transition temperature of between 29° C. to 35° C. (preferred ambient temperature at application of between 10° C. and 28° C.). This can be varied as desired, for example, for use in extreme cold environments provided that the glass transition temperature of the all-acrylic polymer is higher than that of the acrylic co-polymer, and provided that the ambient temperature at application falls between the respective glass transition temperatures of the all-acrylic polymer and acrylic co-polymer. It will be understood that the term 'glass transition temperature' of a polymer or co-polymer is generally accepted to be the temperature that about which (or in a region thereof) the polymer or co-polymer transitions from a hard or glass-like state to a relatively soft and resilient or rubber-like state.

The sprayable composition further includes an anionic hydrophobically-modified alkali swellable acrylic polymer emulsion rheology modifier in the amount of 0.45% to 0.61% w/w, most preferably in the amount of 0.45% to 0.55% w/w. The anionic hydrophobically-modified alkali swellable acrylic polymer emulsion rheology modifier preferably has a polymer content between 25% to 35% w/w and a total solids content of between 25 to 35% w/w.

The sprayable composition additionally includes an ester surfactant in the amount of 0.45% to 0.61% w/w, most preferably in the amount of 0.45% to 0.55% w/w. The ester surfactant preferably includes an ester surfactant content of between 78% to 84% w/w. The ester surfactant of preferred embodiments is a phosphate ester selected from the group consisting of triaryl, trialkyl, and aryl alkyl phosphates.

The sprayable composition includes a foam control agent in the amount of 0.45% to 0.61% w/w and most preferably in the amount of 0.45% to 0.55% w/w. The foam control agent is oil based, most preferably polysiloxane based.

The sprayable composition includes water, preferably distilled, as required for the remaining percentage to meet a total content of 100% w/w. Water is most preferably included in the amount of 5% to 22% w/w.

Referring to the five patent publications herein below, it is understood that the acrylic co-polymer and all-acrylic polymer emulsions are able to be manufactured by various methods of emulsion polymerisation known in the art, including multi-stage emulsion polymerisation. Methods, and associated polymer constituents and reagents, can include at least some of those disclosed in patents U.S. Pat. No. 7,795,343, U.S. Pat. No. 4,814,373. EP0623659, U.S. Pat. No. 6,939,922, U.S. Pat. No. 4,524,093, and patent application US 2003/0088014, the contents each of which are expressly incorporated herein by reference.

Multistage polymerisation is known to refer to the formation of a first polymer domain during a first stage, followed by the formation of at least one additional polymer domain during at least one subsequent stage. The two domains can be of differing polymeric character, for example a hard domain of high glass transition temperature and a soft domain of low glass transition temperature.

The distinct domains of a multi-domain polymer emulsion can reside in separate emulsion particles thereby resembling a mixture of single-stage emulsions, or can adopt a core-shell (or adjoining) configuration whereby a polymer core constituting a first domain is enveloped (or adjoined), completely or not completely, by at least one concentric polymer shell (or adjoining unit) constituting a second or subsequent domain. The polymer core can be pre-crosslinked, for example using at least one of a poly-functional monomer, a self-reactive monomer or a pair of cross-reactive monomers, and/or a crosslinking reagent. A polymer shell can include at least one type of a self-crosslinking monomer.

The acrylic co-polymer in preferred embodiments of the present invention preferably includes at least two polymer domains, of which, the first domain is preferably pre-crosslinked and the second or subsequent domain preferably includes at least one of a self-crosslinking monomer. The all-acrylic polymer preferably includes at least two polymer domains, of which, the first domain is preferably pre-crosslinked, however preferably only to a minor degree relative to the acrylic copolymer. If the all-acrylic polymer is pre-crosslinked, a poly-functional (meth)acrylic monomer is preferred for pre-crosslinking sites. Herein above, (meth) acrylate refers to methacrylate or acrylate.

The all-acrylic polymer and the acrylic co-polymer preferably include at least two different ethylenically-unsaturated monomers joined into polymerised units. The ethylenically-unsaturated monomer can be mono-functional, having one site of ethylenic unsaturation, or poly-functional, having at least two sites of ethylenic unsaturation.

The mono-functional monomer can include an alkylacrylate ester monomer, for example an alkyl methacrylate, an acrylate ester monomer, for example an alkyl acrylate, or a mono-functional ethylenically-unsaturated carboxylic acid or salt thereof. Carboxylic acids or salts thereof, being ethylenically unsaturated as monomers, are preferably included at less than 10% w/w, more preferably less than 5% w/w, and most preferably less than 2% w/w as polymerised units in the all-acrylic polymer and acrylic co-polymer. 'Alkyl' as used herein refers to straight chain, branched, and cycloalkyl forms.

The monofunctional ethylenically-unsaturated carboxylic acid is thought to include acrylic acid or methacrylic acid, and is also thought to include another carboxylic acid containing 3-5 carbons for example itaconic acid, maleic acid, or fumaric acid. Itaconic acid is preferred as a non-acrylic carboxylic acid if such an acid used as a co-monomer in the acrylic co-polymer.

The alkyl methacrylate is thought to include methyl methacrylate, ethyl methacrylate, butyl methacrylate, or lauryl methacrylate, and is also thought to include iso-butyl methacrylate, propyl methacrylate, isopropyl methacrylate, pentyl methacrylate, hexyl methacrylate, 2-ethylhexyl methacrylate, nonyl methacrylate, decyl methacrylate (for example iso-decyl methacrylate), stearyl methacrylate, behenyl methacrylate, iso-bornyl methacrylate, or the like.

Similarly, the alkyl acrylate is thought to include methyl acrylate, ethyl acrylate, butyl acrylate (including isomers thereof), or 2-ethylhexyl acrylate, and is also thought to include hexyl acrylate, methyl acrylate, propyl acrylate, isopropyl acrylate, butyl acrylate, pentyl acrylate, nonyl acrylate, decyl acrylate, lauryl acrylate, or the like.

Other acrylic or methacrylic monomers are thought to include dialkylamino- or dialkylaminoalkyl-substituted (meth)acrylic monomers such as N,N-dimethylaminoethyl (meth)acrylate and trans-butylaminoethyl (meth)acrylate, and are also thought to include aromatic derivatives of (meth)acrylates. Herein above, (meth)acrylate refers to methacrylate or acrylate. If the other acrylic or methacrylic monomers are included in the all-acrylic polymer, they are preferably included in relatively minor quantities subject to any restrictions disclosed hereafter.

The acrylic co-polymer is preferably comprised of at least 50% w/w, more preferably at least 75% w/w, of acrylic monomer (or derivative thereof) as polymerised units. Preferably, the acrylic monomer (or derivative thereof) is the alkyl methacrylate or the alkyl acrylate, preferably having 1-18 carbons per alkyl group, more preferably having 1-12 carbons per alkyl group. Without limitation, the remainder of polymerised units in the acrylic copolymer can be chosen from a poly-functional monomer, a self-reactive monomer or a pair of cross-reactive monomers said reactive monomers having functional sites that are capable of forming crosslinks either independently or in conjunction with a further reagent or constituent (hereafter referred to as a 'self-reactive monomer or cross reactive monomer pair'), the other acrylic or methacrylic monomer, or a non-acrylic co-monomer. The acrylic co-polymer preferably includes at least one poly-functional monomer to achieve intra-particle pre-crosslinking, being crosslinking that occurs within the emulsion particles prior to coalescence.

It is understood that the poly-functional monomer can include derivatives of mono- and poly-(meth)acrylic acids, such as allyl (meth)acrylate, mono-, di-, tri-, or poly-ethyleneglycol di(meth)acrylate, polypropyleneglycol dimethacrylate, butyleneglycol dimethacrylate; 1,3-butyleneglycol di(meth)acrylate; neopentylglycol di(meth)acrylate: 1,4-butanediol di(meth)acrylate; Pentaerythritol di(meth)acrylate; Glycerine di(meth)acrylate; trimethylolethane trimethacrylate: trimethylolpropane tri(meth)acrylate: tripropyleneglycol diacrylate; 1,6-hexenediol di(meth)acrylate; dipentaerythritol triacrylate; dipentaerythritol tetracrylate: dipentaerythritol pentaacrylate: or the like. Herein above, (meth)acrylate refers to methacrylate or acrylate.

Conventionally it could be considered that self-crosslinking requires the inclusion of a self-reactive monomer during emulsion polymerisation. In the preferred embodiments, the self-reactive monomer or cross-reactive monomer pair, included in a polymer emulsion and existing co-polymerised with acrylic units, can be said to exhibit self-crosslinking 'character' if a substantial degree of crosslinking can occur during or after coalescence. Preferably, self-crosslinking character is that which results from crosslinking that substantially occurs after coalescence, and more preferably at a substantially slow reaction rate at ambient temperature relative to the film drying time without the addition of a further reagent or application of heat. Self-crosslinking character thereof can be initiated, mediated, accelerated, or augmented by the application of at least one cycle of heat up to 170° C., and/or an initiator, and/or a catalyst, and/or a cross-linking reagent.

In the preferred embodiments, the self-reactive monomer or cross-reactive monomer pair, is envisaged to include amides of acrylic or methacrylic acid or their N-alkylol or N-acetoacetoxy derivatives, preferably containing 3-12 carbons, for example acrylamide, methacrylamide and N-methylol acrylamide; and is also thought to include other appropriate N- or substituted amides; diacetone acrylamide: hydroxyethyl (meth)acrylate: hydroxypropyl (meth)acrylate; or other appropriate hydroxyalkyl (meth)acrylate; acetoacetoxyethyl methacrylate; epoxidised acrylates such as glycidal methacrylate; a monomer having crosslinking functional groups in common with a cross-linking system referred to in the following paragraph as understood in the part; an appropriate poly-functional monomer or derivitive thereof; appropriate combinations thereof as understood in the art: or the like. Herein above, (meth)acrylate refers to methacrylate or acrylate.

The acrylic co-polymer can include at least one cross-linking reagent that reacts with functional moieties on the polymer. Target functional moieties are envisaged to include for example hydroxyl, carboxyl, acetooxyalkyl, acetoacetoxy, acetoacetamino, cyanoacetoxy, or cyanoacetamino groups. Without limitation, compatible cross-linking reagents can be selected by a person skilled in the art from those systems based upon melamine-formaldehyde and related systems thereof including methylated derivatives such as hexamethoxymethylmelamine, multifunctional amines, oxysilane, hydrazines or hydrazides, isocyanates (such as di- and tri-isocyanates), carboiimides, or aziridines.

The all-acrylic polymer is preferably substantially comprised of the alkyl methacrylate and/or the alkyl acrylate as polymerised units, more preferably having 1-18 carbons per alkyl group. Required proportions of monomer can be estimated using the Fox equation and related analyses as understood in the art to achieve a glass transition temperature in a desired range, such as a preferred range of 29-35° C. for the all-acrylic polymer.

The all-acrylic polymer emulsion's precursory constituents can include without limitation the poly-functional monomer, the self-reactive monomer or cross-reactive monomer pair, the cross-linking reagent, and/or low proportions of a non-acrylic co-monomer or the other acrylic or methacrylic monomer, however only to the extent that the thermoplastic, non-self-crosslinking, and all-acrylic character are substantially maintained as understood by a person skilled in the art.

In the preferred embodiments the all-acrylic polymer exhibits crosslinkable character as understood by a person skilled in the art. In this respect, the all-acrylic polymer can include a different monomer being a monomer other than an alkyl methacrylate or alkyl acrylate which is ethylenically-saturated as a polymerised unit, however only to the extent that the different monomer does not partake in any substantial degree of inter-particle crosslinking without the addition of a further reagent.

The non-acrylic co-monomer is envisaged to include styrene or styrene derivitives; divinyl benzene; vinyl ether; vinyl/ethylene and vinylidine halides; acrylonitrile; 2-12 carbon alkenes; butadiene; ethylenically-unsaturated nitriles containing 3-5 carbons and derivatives thereof; diallyl phthalate; allyl and methallyl substitutions of chlorendate, fumarate, itaconate, phthalate, and isocyanate; vinyl esters of carboxylic acids containing 4-22 carbons, for example vinyl acetate; N-vinyl pyrrolidone; esters of 3-5 carbon ethylenically-unsaturated carboxylic acids totalling 4-20 carbons; polymerisable ethylenically-unsaturated 3-8 carbon mono- and di-carboxylic acids, and esters thereof totalling 4-20 carbons; mono-unsaturated 4-8 carbon dicarboxylic acids; or short-chained polymers of non-acrylic co-monomers; or the like. Preferred non-acrylic co-monomers of the acrylic co-polymer include styrene, acrylonitrile, and vinyl chloride, and derivitives thereof as understood in the art including meth- and cyano-derivitives.

It will be appreciated that the first preferred embodiment of the sprayable glass stabilising composition can include a corrosion inhibitor as desired. For example, an imidazole derivative such as cationic 2-imidozoline derivative can preferably be added in the amount of 0.1% w/w.

In relation to preferred embodiments, the characterisation of dry polymer films formed by the coalescence of polymer emulsions can be performed by various methods known in the art. In particular, the separate emulsions which combine to form the sprayable glass stabilising composition, such as the all-acrylic polymer or the acrylic co-polymer, can be coalesced and characterised in isolation of each other. The suitability of any given method usually depends upon the mechanical properties of the polymer film. Measures of elongation at break, tensile strength, and torsional modulus can be suitable for soft flexible films, whereas measures such as Tukon hardness can be suitable for harder and more rigid films.

Elongation at break, tensile strength, and crack-bridging of the acrylic copolymer are preferably measured on dry polymer film coalesced from an emulsion prepared in accordance with 'standard formulation one' as described hereafter, which is provided for the assessment of mechanical properties of the acrylic co-polymer (the resulting dry polymer film is referred to herein as "the acrylic co-polymer film"). Standard formulation one preferably has a pigment volume concentration of zero, and preferably does not contain a cellulosic thickener.

Constituents used to prepare standard formulation one, expressed as the total of constituents used in both the master batch and let down, preferably include 73-89% self-crosslinking acrylic copolymer emulsion (inclusive of emulsion water content of 47-52%), 0.17-0.31% rheology modifier (preferably based upon non-ionic hydrophobically modified polyethylene oxide urethane), 0.26-0.78% defoamer (preferably based upon polyether (poly)siloxane, and preferably further including active ingredient based upon a dichlorodimethyl silane), 0.4-1.2% surfactant (preferably based upon non-ionic octylphenol ethoxylate), 0.28-0.85% pigment dispersant (preferably based upon maleic anhydride copolymer), 1.6-2.9% polypropylene glycol, 0.08-0.24% biocide (chloromethylisothiazolinone and/or methylisothiazolinone), 0.07-0.20% fungicide (2-noctyl-4-isothiazolin-3-one), 0.03-0.09% ammonia (aqueous), 0.44-0.83% aromatic mineral spirits, 0.44-0.83% aliphatic mineral spirits, and 9.3-17.2% water (exclusive of water content of self-crosslinking acrylic copolymer emulsion); all percentages expressed as w/w (specifically w/w active ingredient unless otherwise self-evident).

In the preparation of standard formulation one, preferably substantially all of the rheology modifier, and preferably substantially 80% w/w of the self-crosslinking acrylic copolymer emulsion, are added during let down. Preferably, all other constituents are mixed during the masterbatch stage for 15-20 minutes in a Cowles dissolver prior to let down, with the exception of the use of preferably less than 60% w/w of the foam control agent and substantially minor quantities of water during let down.

The acrylic co-polymer film preferably exhibits an initial elongation at break of between 400-850% and more preferably between 525-700%, and preferably exhibits an initial tensile strength of between 4-14 MPa and more preferably between 7-12 MPa. Elongation at break and tensile strength are preferably measured in accordance with ASTM (American Society for Testing and Materials International) D2370, preferably using appropriately calibrated strain and elongation rates as referenced therein (e.g. ASTM D882) or as otherwise understood in the art. Elongation at break and tensile strength are preferably measured at (or substantially near) 25° C. with the acrylic co-polymer film having a thickness in the range 50-500 μm.

The acrylic co-polymer film preferably exhibits a crack bridging B-value greater than 3, and more preferably greater than 5. The crack bridging B-value is preferably measured in accordance with AFNOR (Association Francaise de Normalisation) P84-402 as modified by using a scored black vinyl chart as substrate.

Tukon hardness of the all-acrylic polymer is preferably measured on dry polymer film coalesced from an emulsion prepared in accordance with 'standard formulation two' as described hereafter, which is provided for the assessment of mechanical properties of the all acrylic polymer (the resulting dry polymer film is referred to herein as "the all-acrylic polymer film"). Standard formulation two preferably has a pigment volume concentration of zero, and preferably does not contain a cellulosic thickener.

Constituents used to prepare standard formulation two, expressed as the total of constituents used in both the master batch and let down, preferably include (without limitation) 85-96% crosslinkable all-acrylic polymer emulsion (inclusive of emulsion water content of 45-51%), 4-8% of coalescent solvent (preferably ethylene glycol monobutyl ether), 0.05-0.15% foam control agent (preferably based upon siloxane), and 0.05-0.15% non-ionic surfactant (preferably based upon tetramethyl-5-decyne-4,7-diol), and minor additional quantities of water as required; all percentages expressed as w/w (specifically w/w active ingredient unless otherwise self-evident).

The all-acrylic polymer film preferably exhibits a Tukon hardness of 1-7 KHN (Knoop Hardness Number), and more preferably 1.5-6 KHN. The Tukon hardness is preferably measured in accordance with ASTM D1474 and at 25° C.

A reference to an ASTM or AFNOR standard herein above shall be understood as a reference to the most recent revision of the relevant standard as of April 2016.

Hereinafter, a trademark (for example PRIMAL™, ELASTENE™, or RHOPLEX™) may be used in referring to a constituent. When a first trademark includes or is followed by a numeric product descriptor, and a second trademark includes or is followed by the same numeric product descriptor, then the first trademark shall be understood as referring to the same constituent as the second such trademark, however only within comparable product families as understood by the skilled addressee.

EXAMPLES

The following are examples of the sprayable glass stabilising composition according to preferred embodiments utilising commercially available products and are referred to hereinafter by a commercially available product name, associated chemical number affiliated and/or manufacturer. The amounts of the constituent components of the sprayable composition are expedient for use in carrying out preferred embodiments of the invention and are intended to be illustrative only and, except as specifically stated, are not intended to be limiting. That is, the expedient composition constituents are subject to change or cessation by their respective manufacturer/s, and they can be substituted by like constituents provided by other manufacturers or formed by any expedient means. Whilst this description may not include a formal nomenclature used to describe the final composition any reference to amounts means that the composition includes those materials in the stated amounts, or the active ingredients thereof as would be understood by a skilled addressee.

In the first example, the glass stabilising composition includes the self-crosslinking internally-plasticised acrylic co-polymer emulsion on the amount of about 52.6%-67.1% w/w in the form of commercially available ELASTENE™ 2438 (or RHOPLEX™ 2438C) manufactured by the Dow Chemical Company. This can be preferably added in the amount of 52.6% to 55.0% w/w ELASTENE™. The details of the acrylic co-polymer emulsion, ELASTENE™ 2438, are published in the following documents: The Dow Chemical Company, Issue: 9 Oct. 2015, Safety Data Sheet—RHOPLEX™ 2438C Emulsion-USA; The Dow Chemical Company, 884-00122-0612-NAR-EN-CDP Modified: September 2013, Technical Data Sheet RHOPLEX™ 2438C Emulsion; Rohm and Haas, S-2438-1 Created: October 2006, Elastomeric Wall Coating Formulation S-2438-1 based on ELASTENE™ 2438 Acrylic Emulsion; Rohm and Haas, S-2438-2 Created: October 2006, Heat Insulation Coating Formulation S-2438-1 based on ELASTENE™ 2438 Acrylic Emulsion; Rohm and Haas, Created: December 2004, PRIMAL™ 2438 Performance Properties; Rohm and Haas, Created: October 2006, Formulating with ELASTENE™2438 Acrylic Emulsion; Rohm and Haas, Modified: April 2008 ELASTENE™ 2438 TDS—Asia-Pacific; The Dow Chemical Company, 884-00006-1011-NAR-EN-EST File: 2717-DCM Binders Sell Sheet Updated July 2012 v2.indd, Architectural Binders Product Summary Table; The Dow Chemical Company, 884-00113-0612-NAR-EN-CDP Modified: September 2013, Technical Data Sheet RHOPLEX™ EC-2848 100% Acrylic Polymer Emulsion; Rohm and Haas, 81A314 Modified: September 2008 RHOPLEX™ EC-2848 TDS; these documents were last accessed 2016 and their contents are incorporated herein in their entirety by cross-reference.

The sprayable composition includes the crosslinkable thermoplastic all-acrylic polymer emulsion binder in the amount of 23.0% to 31.8% w/w and most preferably in the amount of 23.0% to 26.0% w/w. The binder is the example is preferably is PRIMAL™ AC-3001 (or RHOPLEX™ AC-3001) thermoplastic all-acrylic binder manufactured by the Dow Chemical Company. The details of the all acrylic polymer emulsion, PRIMAL™ AC-3001, are published in the following documents: The Dow Chemical Company, 832-00005-0909 BBI Modified: October 2009, You Asked . . . We Delivered! Leading the Way in High Performance Coatings for Specialty Mat Applications—High-Performance Nonwovens, Specialty Mat and Coatings Vehicles Selection Guide; The Dow Chemical Company, DCC001-1109BOE Modified/Issued: November 2009, Dow Construction Chemicals—Product Portfolio/Offerings; Rohm and Haas, Revision: Oct. 11, 2012, Canada Colors and Chemicals Limited MSDS RHOPLEX™ AC-3001 Emulsion—Canada; Rohm and Haas, Issue: October 2013, MSDS PRIMAL™ AC-3001R Emulsion—Vietnam; Rohm and Haas, Issue: October 2013 MSDS PRIMAL™ AC-3001R Emulsion—Australia; Rohm and Haas, Modified: April 2008 RHOPLEX™ AC-3001 Emulsion TDS; these documents were last accessed 2016 and the contents of which are incorporated herein in their entirety by cross-reference.

In the sprayable composition of the first example, the anionic hydrophobically-modified alkali swellable acrylic polymer emulsion rheology modifier is added in the amount of 0.45% to 0.61% w/w and most preferably in the amount of 0.45% to 0.55% w/w. The emulsion rheology modifier is in the form of a hydrophobically modified anionic thickener commercially known as ACRYSOL™ TT615 manufactured by the Dow Chemical Company. The details of the rheology modifier, ACRYSOL™ TT615, are published in the following documents: Rohm and Haas, Revision: February 2012 Version: 1.6, Safety Data Sheet ACRYSOL™ TT-615 Thickener; Rohm and Haas, Revision: November 2013 Version: 1.5; Material Safety Data Sheet ACRYSOL™ TT-615 Thickener—Canada; The Dow Chemical Company, 884-00205-0213-NAR-EN-CDP Revision/Modified: March 2013, Technical Data Sheet ACRYSOL™ 1T-615 Rheology Modifier; these documents were last accessed 2016 and their contents are incorporated herein in their entirety by cross-reference.

Additionally, the sprayable composition includes an ester surfactant in the amount of 0.45% to 0.61% w/w, and most preferably 0.45% to 0.55% w/w, is a phosphate ester known as STRODEX™ TH-100 manufactured by Ashland, Inc. The details of STRODEX™ TH-100 can be found in: Ashland, 4415-4 Modified: March 2013, Product Data STRODEX™ TH-100 phosphate ester surfactant; this document was last accessed 2016 and its contents are incorporated herein in its entirety by cross-reference.

Also to assist in spraying the composition of the first example onto a glass surface, the composition also includes a foam control agent in the amount of 0.45% to 0.61% w/w, most preferably 0.45% to 55% w/w. The foam control agent is oil based, most preferably polysiloxane based. In the example, the foam control agent is DREWPLUS™ T4507 manufactured by Ashland, Inc. The details of DREWPLUS™ T4507 can be found in: Ashland, 4562-2 Modified: July 2013, Product Data DREWPLUS™ T-4507 Foam Control Agent; this document was last accessed 2016 and the contents are incorporated herein in their entirety by cross-reference.

The remainder of the sprayable composition to 100% w/w is comprised of water as an additional ingredient, however water is most preferably included as an additional reagent in the amount of 5% to 22% w/w.

A second example provides a more specific preferred embodiment of the sprayable composition and includes: 175±5 g ELASTENE™ 2438, 78±3 g PRIMAL™ AC-3001, 1.5±0.05 g ACRYSOL™ 1T615, 1.5±0.05 g STRODEX™ TH-100, 1.5±0.05 g DREWPLUS™ T4507, and 251 g water.

The composition was prepared in an industrial dissolver at 60 RPM over 30 s with ingredients added continuously in the following sequential order: PRIMAL™ AC-3001, ELASTENE™ 2438, DREWPLUS™ T4507, water, STRODEX™ TH-100, and then ACRYSOL™ TT615.

Figure 4:
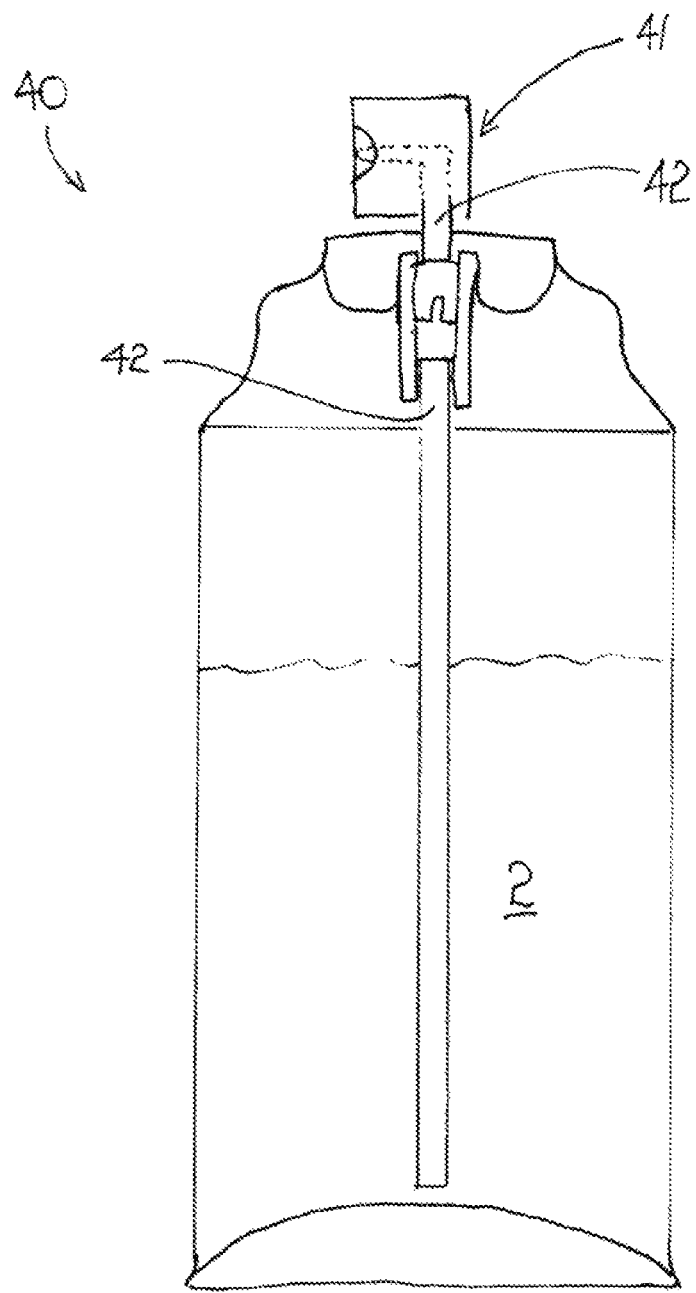
FIG. 4 is a schematic cut-away side view of an aerosol can having the composition according to the first preferred embodiment therein for selectively dispensing.
Figure 5:
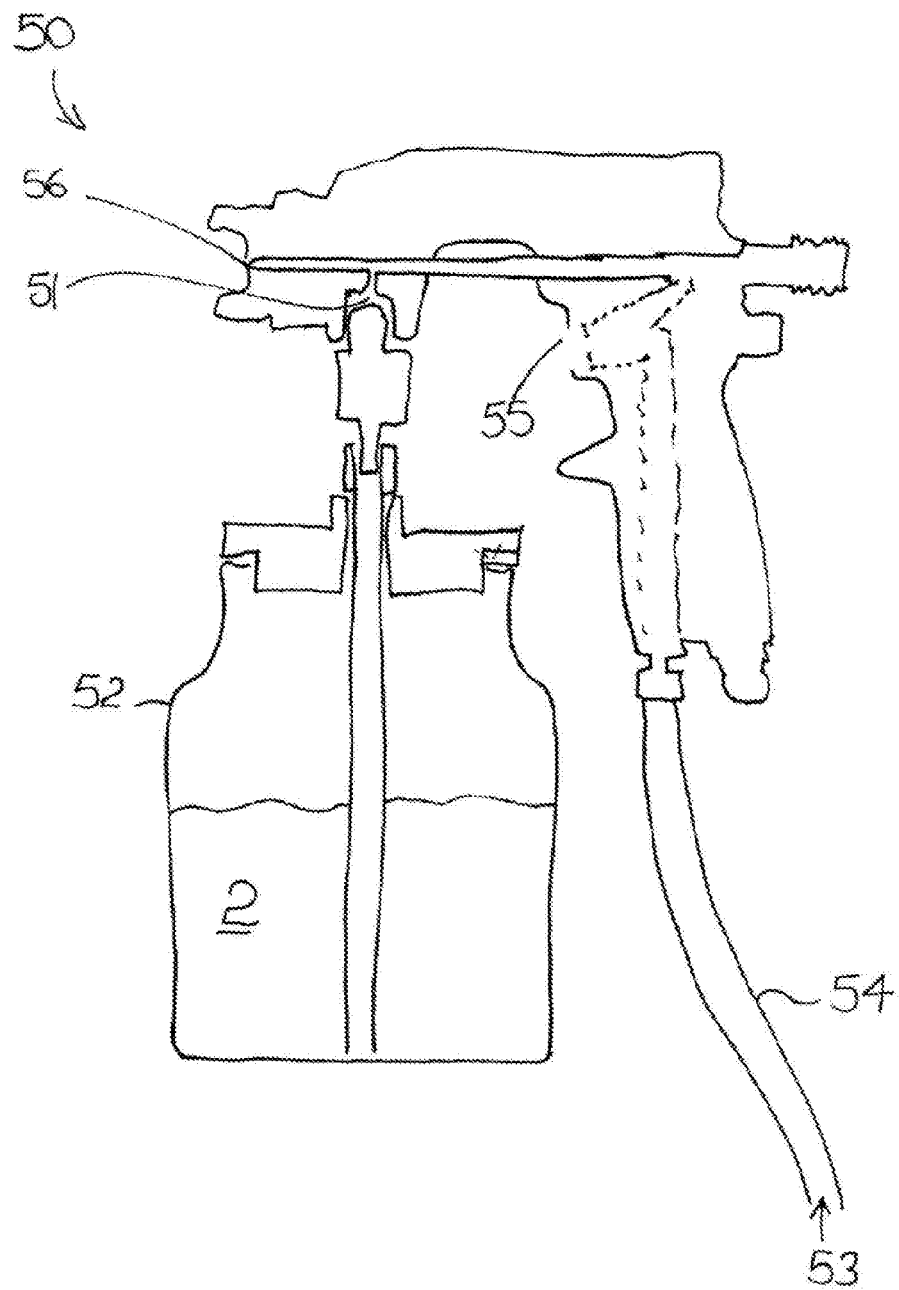
FIG. 5 is a pneumatic spray gun as an alternative dispenser to that of FIG. 4.

In general terms, compositions used in preferred embodiments for a dispenser such as in FIG. 4 are typically marginally thicker in viscosity than common household latex paint. However, viscosity of constituent components can vary according to the batch, age, and storage conditions. If required, the composition viscosity can be modified with appropriate rheology modifiers, or by adjusting solvent content, to ensure compatibility with a given applicator and nozzle.

The composition of the preferred embodiments is a liquid that is able to be sprayed. As such, a method of stabilising glass by spray applying the composition and forming a film coating thereon is also provided. The method includes the step of spraying the liquid composition as a liquid in small or atomised or aerosolised droplets on to one or both faces of the glass pane. The sprayed composition is then allowed to cure over a predetermined time. In practice, this is a relatively short period. This occurs by changes in composition moisture and the sprayed composition forms a film adhered to the glass that continuously solidifies.

The composition of the preferred embodiment is easy to apply and is consumer friendly and not time consuming to apply. Moreover, there is an increasing interest to develop an easy to apply composition that is stable and suitable to be delivered in a desirable spray pattern in order to provide results that are beneficial to the user. The protective film spray composition of the preferred embodiment preferably includes a substantially all liquid emulsification system that has an HLB from about 3.0 to 7.0 (wherein HLB is commonly understood to mean Hydrophile-Lipophile balance of a surfactant). The protective film spray composition is surprisingly stable, notwithstanding the low HLB emulsification system employed, and capable of being applied homogeneously to glass. Moreover, the system and method for delivering the spray protective film composition yields a desirable and continuous spray pattern in the absence of significant sputtering as well as a composition suitable to be relatively quickly dried on the glass.

As noted, the sprayable composition according to preferred embodiments of the invention include a liquid carrier as a primary solvent.

The carrier fluid is preferably water. While many thickening agents are known for increasing fluid viscosity such as that noted above, the preferred polyacrylic acid polymers exhibit a surprising and unexpected tendency to allow free flow under pressure for good sprayability of the sprayable composition, yet to prevent downward flow due to gravity once the sprayable protective film composition is in place on a surface to be protected.

A high yield value indicates that minimum shear stress is required to initiate flow will be greater than that effected by the force of gravity, thus allowing the sprayable protective film composition to non-runningly cling to (ie, dwell on) the surface onto which it has been sprayed, rather than running downwardly or dripping. In addition, there will be significantly reduced risk of damaging or discolouring window frames, adjacent walls or surfaces, furniture, plants, or other items which may be disposed below the surface sprayed with the protective film and which may otherwise be in contact with the protective film in contrast to present and prior protective methods used.

FIG. 1 is a schematic representation of the broken glass and frame to be sprayed with the film, the glass pane (1) having been sprayed with the sprayable glass stabilising composition according to an example above. The composition is allowed to dry and the exploded view in FIG. 1 shows the cured film (2) as being able to be peeled away from or removed from the glass frame (3). After the broken glass and the frame have been covered with the film and then the film allowed to cure the film is removed from the window frame. The top left portion of the glass pane (1) in FIG. 1 is shown cracked or shattered and this would have the film (2) applied thereto, however, that portion of FIG. 1 is intended to show the cracked glass pane (1).

Figure 2:
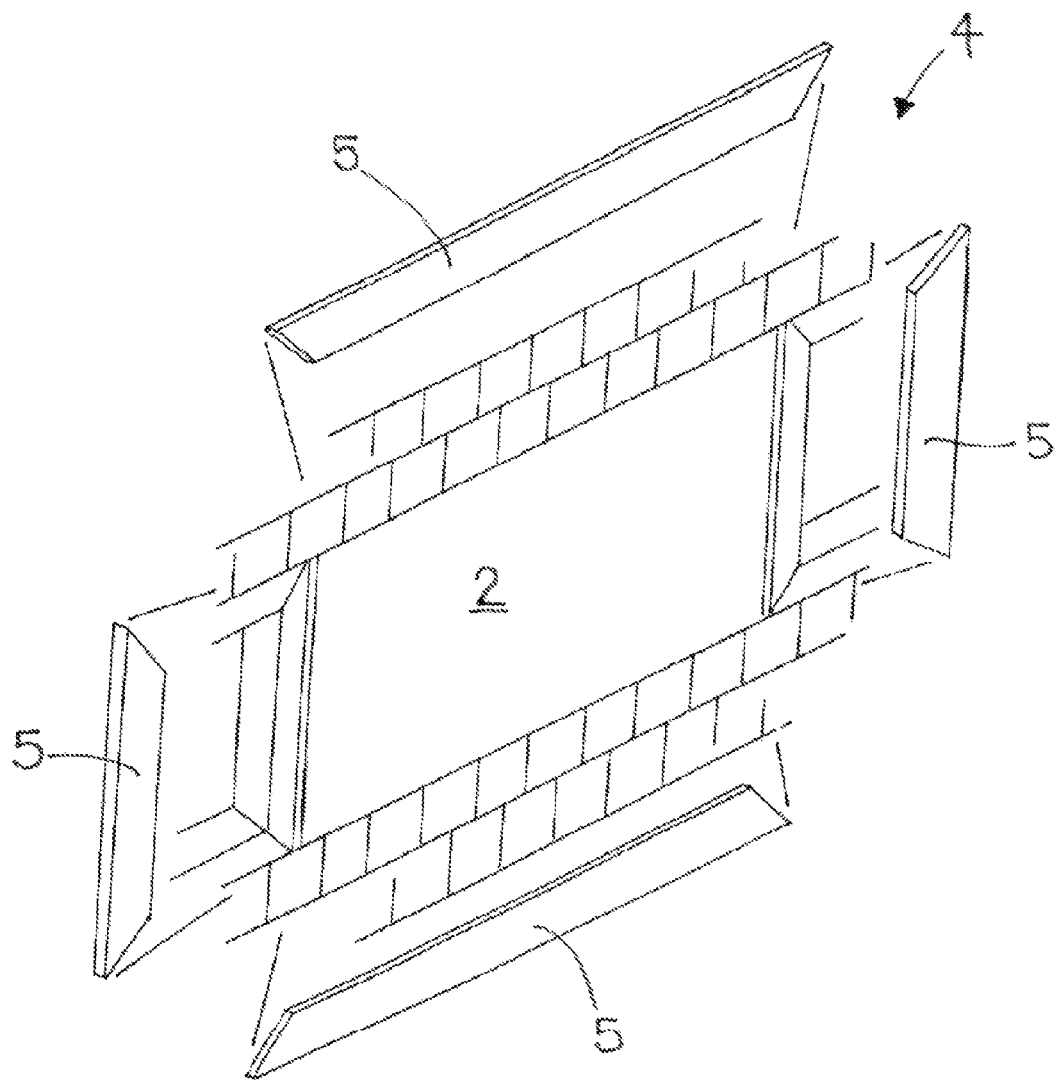
FIG. 2 is a schematic elevated perspective view of the removal of the frame at the window pane of FIG. 1.

In FIG. 2, the window (4) includes a surrounding frame formed from discrete frame members 5. Once the composition has cured to a film (2), each of the frame member (5) is able to be removed individually. Advantageously, as each frame member (5) is removed, the composition can be sprayed onto the area about the removed frame member (5). On removing each section of the frame the film may be sprayed to those vacant areas. In this way, any remnants or fragments from glass pane (1) can be entrained with the composition as it cures and forms a film. It can be seen that the glass pane (1) having film (2) remains intact. The broken glass and the film have been left as one piece. The frame has safely been removed from the window.

Figure 3:
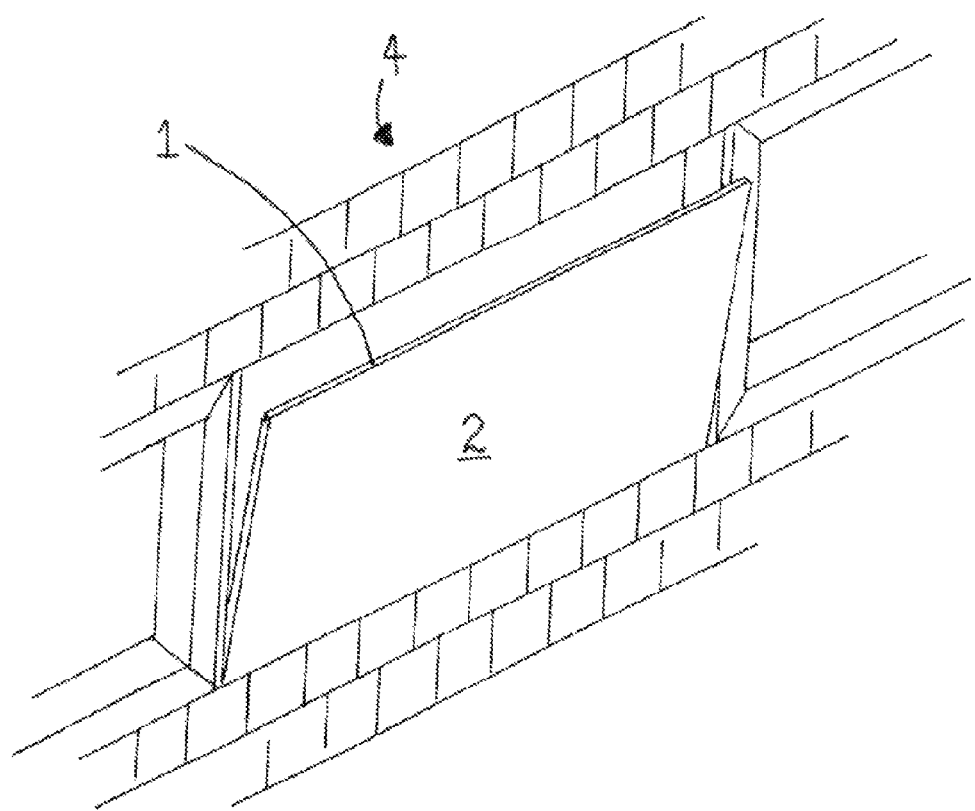
FIG. 3 is a schematic elevated perspective view of the window pane of FIG. 1 being removed.

FIG. 3 shows the glass pane (1) being removed as one piece with the cured film (2) providing structural strength to prevent the glass pane (1) crumbling or separating. The removed pane (1) can be discarded as one piece with the cured film (2) left in place or the film (2) can be removed or partially removed as desired. The broken glass has been secured as one piece with the film and can now be removed safely.

As the film (2) is cured, a predetermined force is applied to the glass pane (1) over which the sprayable composition has formed the film (2). This removes the fractured or broken glass pane (1) remnants attached to the cured composition film (2). The cured film (2) retains the glass pane (1) and remnants. Most advantageously and hitherto unknown, any of the composition sprayed other than on glass can simply be peeled off once cured without any damage to the frame (3) or surrounds to which the composition was applied, for example, to painted or aluminium surrounds. Thus, no masking, especially precise masking on any surrounding surfaces is required as the cured film (2) does not damage surrounding surfaces.

A systems and apparatus for applying or spraying the composition of the example above to stabilise a glass pane (1) or remnants thereof is also contemplated. In particular, the system includes a container. In one embodiment, the container (40) is adapted to hold a pressurised predetermined volume of the composition. In another embodiment, the container (40) is configured to hold a predetermined volume of the composition whereby the container (40) is adapted to be pressurised by a pressurising fluid, namely either charged or where an external compression source such as an air compressor or hand pump is used. It will be appreciated that any preferred pressuring fluid can be used as desired, however, nitrogen as a propellant is preferred.

The first preferred embodiment of a dispenser is shown in FIG. 4 and contemplates application via an aerosol can arrangement with the container (40) holding the composition 2 in liquid form. The liquid composition (2) pressurised by a propellant being nitrogen and the container is aluminium. Preferably, the composition in the aerosol can (40) is under a pressure of between 2 bar to 8 bar (where 1 bar of pressure is equivalent to approximately 14.5 psi) However, if a container having appreciable iron content such as common steel is used, the cationic 2-imidazoline derivative above can be added as a corrosion inhibitor if desired in the amount of preferably 0.1% w/w of the composition.

In the system, an actuator (41) is provided to allow the selective release of the composition under pressure for application directly from the container (40) onto the pain (1). The actuator (41) is connected to an outlet (42) of the container (40) and configured to be operated to selectively release the composition under pressure. In this embodiment, only an outlet (42) is provided making the container (40) disposable.

A second preferred embodiment of an applicator for the composition (2) is shown in FIG. 4. This is based on a conventional air-compressor powdered spray gun (50) having a pressure of between about 3 bar to about 30 bar. The gun (50) includes an inlet (51) to receive the liquid composition (2) from a re-fillable container (52). Within the gun (50), the composition inlet (51) is in fluid composition with compressed air inlet (53). The compressed air is provided by a conventional air composition (not illustrated), connected by hose (54).

An actuator (41) or trigger (55) allows releases of compression air from nozzle (56) of the gun (50). The flow of compressed air through the gun (50) draws the liquid composition (2) and entrains this into the airstream as atomised droplets. The droplets are dispensed on (or around) pane (1) and left to cure to form film (2). Advantageously, use of a relatively high pressure air compressor allows the liquid composition (2) to be sprayed onto and about glass surfaces many meters away, for example, to a second storey window.

It will be appreciated that the sprayable composition does not need to be applied with a uniform thickness to the pane (1). It only needs to be applied so as to cover or substantially cover the pain (1) to allow the film to form thereon. In a particularly preferred embodiment, the composition according to the preferred embodiment can be placed into a manual pump spray applicator such as Model SSA manufactured by Calmar, Inc. having an orifice size of 0.025 inches in diameter. Here, the sprayable composition was found to be equally effective when sprayed onto the surface using this manual pump spray applicator. The sprayable composition according to a preferred embodiment was found to be sprayable and to have a surprising tendency to non-runningly cling to and to dwell on surfaces disposed at any orientation when sprayed thereon, yet the sprayable protective film composition provided excellent surface protection while being easily spread onto any glass surface.

It will be appreciated that the system above is the first known to dispense a one-part composition for stabilising glass panes. Of course as the composition cures and the film (2) forms, it adds relatively insignificant weight on application and once cured.

Also, it will be appreciated that in an exemplary embodiment use of the composition provides an emergency substantially clear glass film (2) from a spray can for the stabilizing a shattered, broken, cracked glass in a window, door, curtain, partition structure having a window, door, curtain, partition frame (3) entirely or substantially entirely devoid of glass to cover the opening in its entirety. A body of unifying clear film (2) is sprayed over and bonded to the glass to form a cohesive mass therewith. This is especially advantageous in a home environment since a can is relatively small and requires no special skill to apply.

Some of the advantages of the present invention are that the risks of injury and/or damage presented by window, door, curtain, partition structures having shattered, broken, cracked window, door, curtain, partition glass panes or window, door, curtain, partition glass panes are:

(i) entirely or substantially entirely missing or greatly reduced; shattered, broken, cracked glass panes of window, door, curtain, partition structures can safely remain in place for some time prior to removal;

(ii) window, door, curtain, partition structures in which all or substantially all of the glass is missing can be stabilized prior to and while awaiting installation of replacement glass;

(iii) the barrier or seal that is compromised in window, door, curtain, partition structures having damaged or missing glass can be substantially or fully restored while allowing the damaged glass to be left in place with the film (2) thereon;

(iv) window, door, curtain, partition structures can be stabilized and/or damaged glass removed therefrom in substantially less time and with substantially less labour than are required for other stabilizing and removal procedures;

(v) the cohesive or unifying material is easy to apply with only negligible pressure or force being exerted on the glass; formation of one or more cohesive or unified masses may be achieved in only a short time after the unifying spray film (2) is applied;

(vi) a shattered, broken, cracked pane can be stabilized and removed quickly in one procedure, if desired; window, door, curtain, partition glass pane shards can be removed quickly in one procedure;

(vii) the unifying spray film (2) may be used for stabilization and/or removal of shattered, broken, cracked glass panes in emergency situations, particularly windows, doors, curtains, partitions can be stabilized quickly following catastrophic events, such as earthquakes, explosions, and the like, which may result in massive glass window, door, curtain, or partition damage;

(viii) intact glass windows, doors, curtains, partitions can be structurally reinforced by the spray film (2) material quickly prior to predictable catastrophic events as well as during the occurrence of certain catastrophic events; the weight of the unifying spray film (2) on the glass is insubstantial;

(ix) the composition/compositions for the unifying spray film (2) material can be stored in small containers prior to use; the composition/compositions may be provided with a shelf life, where conditions of stored would apply;

(x) the unifying spray film (2) material can be applied by one person; the unifying spray film (2) material may be translucent so that light may pass there through;

(xi) the unifying spray film (2) material may be applied to the exterior side and/or the interior side of a glass window, door, curtain, partition structure;
(xii) enhanced stabilization and protection may be achieved by applying the unifying spray film (2) material to both the exterior and interior sides;
(xiii) the unifying spray film (2) material will not lose its shape or protective qualities when exposed to environmental elements such as rain;
(xiv) the composition of the preferred embodiment fulfils unmet needs of emergency responders and do-it-yourself repairers as well as glass professionals;
(xv) the methods of stabilizing and/or removing may be self-customized to optimize use in diverse situations;
(xvi) the ability to use a variety of different types of applications; and
(xvii) the composition of the preferred embodiments can prevent uncontrolled crumbling of toughened glass as well as the release of any glass dust or potentially dangerous particles caused by the crumbling.

In another preferred embodiment, a glass stabilising composition is provided in solid form, the solid having been formed by spraying the glass stabilising composition of the aforementioned preferred embodiments at relatively high pressure so that the composition forms relatively small sized particles, for example between 20 to 200 µm, which subsequently coalesce and dry in isolation of each other to form a powder. In particular, there is provided a solid glass stabilising composition comprising: a self-crosslinking internally-plasticised acrylic co-polymer in the amount of 0.25 to 0.67 relative proportion (w/w); a crosslinkable thermoplastic all-acrylic polymer binder in the amount of 0.11-0.30 relative proportion (w/w); an anionic hydrophobically-modified alkali swellable acrylic polymer rheology modifier in the amount of 0.0011 to 0.0040 relative proportion (w/w); an ester surfactant in the amount of 0.0035 to 0.0097 relative proportion (w/w); and a foam control agent in the amount of 0.005 to 0.012 relative proportion (w/w). The polymers, foam control agent, and surfactant can be as described in the first preferred embodiment above. The solid glass stabilising composition in powder form can be applied to glass and heated to coalesce the powder particles to form a film or protective coating.

The aforementioned preferred embodiments and example of the present invention advantageously provide sprayable protective compositions suitable for the temporary protection of glass surfaces such as exterior windows and doors, or interior windows and door glass surfaces through the deposition on the surface of the protective film 2. The film 2 can subsequently be readily removed therefrom when required by a simple peeling operation.

So far as there exists a need for a product that can provide a temporary protection for exterior and interior glass surfaces against weather conditions, contamination from the atmosphere, or accidental damage the composition of the preferred embodiments satisfies this. The present composition provides such protection by applying to the existing glass surfaces a sprayable protective film which can easily be removed later without deleterious effect upon the glass surfaces in question.

Such protection is particularly desirable in the commercial building industry, where a completed or partially completed commercial building may have broken or fractured glass surfaces which necessitates the building or the surrounding commercial area being closed until such broken or fractured glass surfaces are repaired. For example, where a newly completed building may have a commonly used expedient to coat the newly built structure with a weather-proofing and to some extent damage-resistant laminated shield or protective glass surface that prevents broken or fractured pieces of glass falling from the building to protect the building structure and surrounding area from damage, this is not true for most older buildings. These structures have not been fitted with such features as they are hitherto unknown. These types of buildings account for the majority of structures in commercial areas. Thus the need for a temporary protection for exterior and interior glass surfaces is evident and the sprayable protective film composition 2 of the preferred embodiments is suitable for such temporary protection and which can subsequently be easily removed.

It will be appreciated that the protective film composition may be applied to glass structures by any conventional method of spraying, (including aerosol or manual spraying). The applied material is then allowed to dry, either spontaneously at room temperature or under moderately forcing conditions in a current of warm air. Coalescence and the development of a satisfactory water-resistant film are found to occur more rapidly with the compositions of the invention than with the prior art compositions based on foam applications. This advantage is of particular significance when the compositions are used for temporary protection of glass surfaces that are out of doors and are liable to be subjected to various weather conditions very shortly after application.

The foregoing describes only one embodiment of the present invention and modifications, obvious to those skilled in the art, can be made thereto without departing from the scope of the present invention.

The term "comprising" (and its grammatical variations) as used herein is used in the inclusive sense of "including" or "having" and not in the exclusive sense of "consisting only of".

The invention claimed is:

1. A sprayable glass stabilising composition comprising:
   a self-crosslinking acrylic co-polymer emulsion in the amount of 52.6% to 67.1% w/w;
   a crosslinkable thermoplastic all-acrylic polymer emulsion in the amount of 23.0% to 31.8% w/w, the crosslinkable thermoplastic all-acrylic polymer having a higher glass transition temperature than the self-crosslinking acrylic co-polymer emulsion;
   an anionic hydrophobically-modified alkali swellable acrylic polymer emulsion rheology modifier in the amount of 0.45% to 0.61% w/w;
   an ester surfactant component in the amount of 0.45% to 0.61% w/w;
   a foam control agent in the amount of 0.45% to 0.61% w/w; and
   remaining content as water to 100% w/w.

2. A sprayable glass stabilising composition according to claim 1 comprising:
   the self-crosslinking acrylic co-polymer emulsion in the amount of 52.6% to 55% w/w;
   the crosslinkable thermoplastic all-acrylic polymer emulsion in the amount of 23% to 26% w/w;
   the anionic hydrophobically-modified alkali swellable acrylic polymer emulsion rheology modifier in the amount of 0.45% to 0.55% w/w;
   the ester surfactant component in the amount of 0.45% to 0.55% w/w;
   the foam control agent in the amount of 0.45% to 0.55% w/w; and
   remaining content as water to 100% w/w.

3. A sprayable glass stabilising composition according to claim 1 wherein the ester surfactant is a phosphate ester.

4. A sprayable glass stabilizing composition according to claim 3 wherein the phosphate ester is selected from the group consisting of triaryl, trialkyl, and aryl alkyl phosphates.

5. A sprayable glass stabilizing composition according to claim 1 wherein the foam control agent is oil based.

6. A sprayable glass stabilizing composition according to claim 5 wherein the foam control agent is polysiloxane based.

7. A sprayable glass stabilising composition according to claim 1 wherein the self-crosslinking acrylic co-polymer emulsion includes an acrylic co-polymer content of between 48% to 53% w/w.

8. A sprayable glass stabilising composition according to claim 1 wherein the crosslinkable thermoplastic all-acrylic polymer emulsion includes an all-acrylic polymer content of between 45 to 51% w/w.

9. A sprayable glass stabilising composition according to claim 1 wherein the anionic hydrophobically-modified alkali swellable acrylic polymer emulsion rheology modifier includes a polymer content of 25 to 35% w/w.

10. A sprayable glass stabilising composition according to claim 1 wherein the ester surfactant component includes an ester surfactant content of between 78 to 84% w/w.

11. A sprayable glass stabilising composition according to claim 1 wherein the self-crosslinking acrylic co-polymer emulsion has a total solids content of between 48% to 53% w/w.

12. A sprayable glass stabilising composition according to claim 1 wherein the crosslinkable thermoplastic all-acrylic polymer emulsion has a total solids content of between 45% to 51% w/w.

13. A sprayable glass stabilising composition according to claim 1 wherein the anionic hydrophobically-modified alkali swellable acrylic polymer emulsion rheology modifier has a total solids content of between 25% to 35% w/w.

14. A sprayable glass stabilising composition according to claim 1 wherein the self-crosslinking acrylic co-polymer has a glass transition temperature of between $-25°$ C. to $-19°$ C.

15. A sprayable glass stabilising composition according to claim 1 wherein the crosslinkable thermoplastic all-acrylic polymer has a glass transition temperature of between $-29°$ C. to $-35°$ C.

16. A sprayable glass stabilising composition according to claim 1 wherein a dried polymer film of the self-crosslinking acrylic co-polymer emulsion has an initial elongation at break of between 400-850%.

17. A sprayable glass stabilising composition according to claim 16 wherein a dried polymer film of the self-crosslinking acrylic co-polymer emulsion has an initial elongation at break of between 525-700%.

18. A sprayable glass stabilising composition according to claim 1 wherein a dried polymer film of the self-crosslinking acrylic co-polymer emulsion has an initial tensile strength of between 4-14 MPa.

19. A sprayable glass stabilising composition according to claim 18 wherein a dried polymer film of the self-crosslinking acrylic co-polymer emulsion has an initial tensile strength of between 7-12 MPa.

20. A sprayable glass stabilising composition according to claim 1 wherein the self-crosslinking acrylic co-polymer has a crack bridging B-value greater than 3.

21. A sprayable glass stabilising composition according to claim 20 wherein the self-crosslinking acrylic co-polymer has a crack bridging B-value greater than 5.

22. A sprayable glass stabilising composition according to claim 1 wherein a dried polymer film of the crosslinkable thermoplastic all-acrylic polymer emulsion has a Tukon hardness between 1 to 7 KHN.

23. A sprayable glass stabilising composition according to claim 22 wherein a dried polymer film of the crosslinkable thermoplastic all-acrylic polymer emulsion has a Tukon hardness between 1.5 to 6 KHN.

24. A sprayable glass stabilising composition according to claim 1 comprising:
the self-crosslinking acrylic co-polymer emulsion in the amount of about 62% w/w;
the crosslinkable thermoplastic all-acrylic polymer emulsion in the amount of about 27% w/w;
the anionic hydrophobically-modified alkali swellable acrylic polymer emulsion rheology modifier in the amount of about 0.53% w/w;
the ester surfactant component in the amount of about 0.53% w/w;
the foam control agent in the amount of about $-0.53\%$ w/w; and
remaining content as water in the amount of about 9% w/w.

25. A sprayable glass stabilising composition according to claim 1 including a cationic 2-imidazoline derivative corrosion inhibitor in the amount of 0.05% to 0.15% w/w.

26. A sprayable glass stabilising composition according to claim 1 wherein the self-crosslinking acrylic co-polymer is internally-plasticised.

* * * * *